United States Patent Office 3,197,439
Patented July 27, 1965

3,197,439
PREPARATION OF POLYESTER RESINS
Horst E. Frey, Chicago, Ill., assignor to Standard Oil Company, Chicago, Ill., a corporation of Indiana
No Drawing. Filed Aug. 30, 1960, Ser. No. 52,763
9 Claims. (Cl. 260—75)

This is a continuation-in-part of my copending application Serial No. 25,505, filed April 29, 1960, now United States Patent No. 3,067,179.

This invention relates to polyester resins and particularly to an improved process of preparing polyester resins.

Polyester resins are the products of the polycondensation (polyesterification-condensation) of carboxyl acids and alcohols, each of which contain at least two active functional groups. When the reactants each contain only two active functional groups, such as adipic acid and ethylene glycol, it is easy to control the course of the polycondensation. When the polycondensation involves reactant(s) containing two active functional groups and reactant(s) containing more than two active functional groups is present, it is possible to have a cross-linking reaction occur which produces insoluble resins. It is not easy to avoid gelation in polycondensation reactions of this type when it is desired to force the reaction substantially to completion, i.e., the polyester resin has reached the desired acid number. This undesirable gelation takes place even though the relative amounts of the reactants are such that theoretically all of the carboxyl and hydroxyl groups can react without occurrence of cross-linking. As the reaction proceeds toward completion, the tendency toward cross-linking is increasing markedly and it is very difficult to stop the polycondensation reaction short of the gelation point.

This invention is directed toward the preparation of polyester resins which normally tend to gel and provides a means of controlling the reaction without gelation. It has been discovered that when a polyester resin is being prepared by polycondensation of organic reactant containing more than two active functional groups with other organic reactant(s) containing only two active functional groups—these functional groups being either carboxyl or hydroxyl and one reactant having carboxyl groups and the other having hydroxyl groups—the polycondensation is easily controlled by introducing into the polycondensation zone, at least a substantial time before the gel point has been reached, either an alkanol or an alkanoic acid. An alkanol is added to the condensation zone when the acid is the reactant containing more than two active functional groups. An alkanoic acid is added when an alcohol is the reactant containing more than two active functional groups. The added alkanol or alkanoic acid is not permitted to remain with the polyester product and is removed by vaporization from the reaction vessel after the polyester resin has reached the desired acid number. The amount removed is dependent upon the particular reactants and reaction conditions but, in general, substantially all is removed. "Substantially all" is to be understood as meaning at least on the order of 50% of the added alkanol and alkanoic acid is removed from the reaction zone by vaporization. Usually the degree of removal is on the order of 70–90 percent. The amount of participation of the added alkanol or alkanoic acid in the polycondensation reaction is in part determined by the time at which the alkanol or alkanoic acid is added to the polycondensation reaction zone. (Removal by vaporization may be effected in most instances by cutting off the reflux condenser normally utilized; in some instances it may be necessary to use vacuum on the system in order to vaporize the desired amount of alkanol or alkanoic acid.)

The organic reactant containing more than two active functional groups may be either a polycarboxylic acid or a polyhydric alcohol. As is known, the presence of three or more carboxyl groups or hydroxyl groups does not mean the compound has a functionality equal to the number of functional groups. Owing to steric hindrances and other considerations, one or more functional groups may not be able to participate. In order to have the possibility of cross-linking, it is necessary that one of the reactants charged to the polycondensation zone have more than two active functional groups.

The other organic reactant contains only two active functional groups. Thus, it is possible that the other reactant may contain more than two carboxyl groups or more than two hydroxyl groups as long as those in excess of two cannot participate to any appreciable degree in the polycondensation reaction.

It is to be understood that when the reactant containing more than two active functional groups is a polycarboxylic acid then the reactant containing only two active functional groups is a polyhydric alcohol. And when the reactant containing more than two active functional groups is a polyhydric alcohol then the reactant containing only two active functional groups is a polycarboxylic acid.

The defined reactants are charged to the polycondensation zone in the molar ratio needed to produce polyester resin of the desired acid number. Usually the carboxyl groups and hydroxyl groups are present in equal molar amounts so that theoretically the final polyester resin will have an acid number of zero. In the art, it has been found that better results were obtained when an excess of hydroxyl groups are present over that theoretically needed to react with the carboxyl groups present. In general, the excess of hydroxyl groups is not more than about 25 percent and is more commonly between about 5 and 15 percent. The process of the invention hereinafter defined is applicable not only to polycondensation reactions where all of the reactant A and all of reactant B are charged to the reaction vessel at the beginning of the reaction but also to stagewise reactions wherein reactants are added in a number of quantities or even one of the reactants is withheld until the other reactants have reacted to a substantial degree.

The polycondensation reaction which is involved in the process of the invention is a typical well-known reaction. The reaction is particularly well described in Chapter II of "Polyesters and Their Applications," Rheinhold Publishing Corporation, 1956.

After the polycondensation reaction of the two reactants has proceeded to at least about the 50 percent point, there is introduced into the reaction zone a monofunctional organic material. This monofunctional material is either an alkanol containing 2–13 carbon atoms and preferably 4–8 carbon atoms or an alkanoic acid containing 2–8 carbon atoms. In any event, the monofunctional material must be added a substantial time before the gel point has been reached in the polycondensation reaction. Since the gel point differs for particular reactants, it may be necessary to have a test run to determine the precise time of introduction of the added monofunctional organic material. The particular added material is determined by the type of organic reactant containing the more than two active functional groups which has been charged to the polycondensation reaction. Briefly, the added material is alkanol when the reactant is acid and the added material is acid when this reactant is alkanol. To illustrate, in the polycondensation reaction of trimellitic anhydride and propylene glycol, the added monofunctional organic material would be alkanol, such as butanol. In the polycondensation reaction of trimethylol propane and adipic acid, the monofunctional organic material would be alkanoic acid, such as propanoic. It is to be understood that the particular monofunctional organic material added will be determined in part by the ability of that material to be vaporized from the reaction zone at the completion of the polycondensation reaction.

The added monofunctional organic material is introduced in an amount of about 0.1 to about 1.0 mole per mole of organic reactant containing more than two active functional groups. It is to be understood that the amount of monofunctional organic material added to the reaction zone is over and above the amount of polycondensation reactants already present in the reaction zone. Thus, the polyfunctional organic reactants will have been charged and partially reacted in the amounts required to obtain the particular acid number; as well as any excess, such as is normally used with polyfunctional alcohols. In general, the amount of material added is held to a minimum although in some cases it may be desirable to utilize added material under conditions such that the added material participates in the polycondensation reaction to a degree and produces a modified polyester resin having some particular desired properties not available from the direct polycondensation of two or more polyfunctional containing group compounds. In general, the amount of added material introduced into the polycondensation zone will be on the order of 0.1 to 0.5 mole per mole of reactant containing more than two active functional groups.

By way of example, the alkanols include methanol, ethanol, isopropanol, n-butanol, hexanol, octyl alcohol, 2-ethyl hexanol, and tridecanol. The mixture of alcohols from the Oxo process are suitable added materials; these alcohols are available as iso-octyl alcohol, nonyl alcohol, decyl alcohol, and isotridecyl alcohol.

The alkanoic acids are, by way of example, acetic acid, propanoic acid, butanoic acid, methyl propanoic acid, pentanoic acid, hexanoic acid, heptanoic acid, and octanoic acid.

The hydroxyl group affording reactant may be any aliphatic polyol containing at least two hydroxyl groups; while polyols containing elements other than carbon, hydrogen, and oxygen may be used—as long as these other elements do not produce active functional groups—it is preferred to operate with polyols which contain only carbon, hydrogen, and oxygen. The alkylene glycols are particularly suitable compounds affording two hydroxyl groups. These glycols may be either simple glycols or ether glycols. Illustrations of these glycols are ethylene glycol, propylene glycol, neopentyl glycol, diethylene glycol, dipropylene glycol, triethylene glycol, tetraethylene glycol, and tripropylene glycol. Illustrations of suitable polyols containing at least three hydroxyl groups are glycerol, trimethylol propane, erythritol, pentaerythritol, dipentaerythritol, threitol, xylitol, and mannitol.

The organic reactant may be either an aliphatic polycarboxylic acid or an aromatic polycarboxylic acid. It is preferred to have aliphatic acids which contain only carbon, hydrogen, and oxygen. It is also preferred to utilize benzene carboxylic acids which contain as functional groups only carboxyl groups; that is, there may be substituted on the benzene ring alkyl groups, or other carbon-hydrogen groups which do not interfere with the polycondensation reaction.

Illustrations of these benzene polycarboxylic acids are: the phthalic acids, such as isophthalic acid and phthalic anhydride; the benzene tricarboxylic acids, such as trimellitic anhydride and trimesic acid; the benzene tetracarboxylic acids, such as pyromellitic dianhydride. The benzene polycarboxylic acids include not only those containing only one benzene ring but also two benzene rings, such as diphenyl configuration or two benzene rings joined by a group as illustrated by benzophenone dicarboxylic acid wherein each carboxyl group is on a different phenyl group. Illustrative of the preferred aliphatic carboxylic acids are malonic, succinic, glutaric, adipic, pimelic, suberic, azelaic, sebacic, tricarballylic (1,2,3-propane tricarboxylic), maleic, fumaric, citraconic, itaconic, aconitic (1,2,3-propene tricarboxylic).

It is to be understood that the reactants charged to the polycondensation zone may be a diverse mixture. For example, the carboxyl group affording reactants may be a mixture of dicarboxylic acid(s) and tricarboxylic acid(s). A benzene acid and an aliphatic acid may be charged together or the hydroxyl group affording compound may be triol and diol including a mixture of each of these.

UNSATURATED POLYESTER

This procedure is particularly applicable to unsaturated polyester resins of the following type. In the unsaturated polyester resin, the polycarboxylic acid is a benzene tricarboxylic acid containing no substituents other than carboxyl or anhydride groups. These acids are trimellitic acid, trimellitic anhydride, trimesic acid, hemimellitic acid and hemimellitic anhydride.

The unsaturated dicarboxylic acids utilized are alkenedioic acids and corresponding anhydrides thereof, which contain 4–8 carbon atoms. Illustrative of these unsaturated dicarboxylic acids are fumaric acids, maleic acid, maleic anhydride, allylmalonic acid, allylmalonic anhydride, isopropylidene malonic acid, isopropylidene malonic anhydride, itaconic acid, itaconic anhydride, citraconic acid, citraconic anhydride, mesaconic acid, glutaconic acid, glutaconic anhydride, dimethylaticonic acid, methylene glutaric acid, allyl succinic acid, trimethyl glutaconic acid, and diethyl maleic acid. Fumaric acid and maleic anhydride are particularly suitable.

The dihydric alcohol utilized in the resin preparation is an alkylene glycol containing 2–8 carbon atoms. These may be either simple glycols or ether glycols. Examples of suitable glycols are ethylene glycol, butylene glycol, hexanediol, diethylene glycol, dipropylene glycol, and triethylene glycol. It is preferred to utilize glycols containing 2–4 carbon atoms.

The benzene dicarboxylic acid is either phthalic acid, phthalic anhydride, isophthalic acid, or terephthalic acid.

The mole ratio of benzene tricarboxylic acid to alkenedioic acid charged is dependent upon the qualities desired in the particular final resin; this ratio may be from about 9:1–1:9 and preferably this mole ratio is about 2:1–1:2. (For example, trimellitic anyhydride: alkenedioic=about 1:3.)

The benzene tricarboxylic acid and benzene dicarboxylic acid mole ratio may vary from about 1:9 to 9:1. The particular mole ratio will be dependent upon the properties desired in the final resin. (For example, trimellitic anhydride:isophthalic acid=about 1.5.) However, the sum of the benzene tricarboxylic acid and the benzene dicarboxylic acid must provide a mole ratio of the sum to the alkenedioic acid present of 1:9–9:1 and preferably 1:2–2:1.

Sufficient glycol is charged to the reaction zone to react with the free-carboxyl groups. Usually, there is charged about 1 mole of glycol for each mole of benzene dicarboxylic acid plus 2 moles for each mole of tricarboxylic acid plus 1 mole for each mole of alkenedioic acid. In some cases a larger excess of glycol is used, about 102–110% of the sum calculated from the acid usages.

EXAMPLE

For purpose of illustration, the apparatus and general procedure typically used in the preparation of unsaturated polyesters are described in detail herein below.

*Apparatus.*—In the laboratory, it is preefrred to use 1,000 ml. round bottom flasks fitted with a Teflon stirrer through a ground glass neck, a bulb type reflux condenser with four of the five bulbs packed with glass beads. Steam is passed through this reflux condenser to permit a passage of water or azeotrope vapor. On top of this condenser is mounted a Dean-Stark type water trap and on top of the trap, is a water-cooled reflux condenser. Also connected with the flask is a nitrogen inlet and thermometer.

Ingredients are placed in the flask and the mixture is carefully heated so that the temperature rises above 250° F. within approximately 30 minutes. Mechanical stirring at constant speed is then possible with most compounds. Strong agitation with constant splashing cuts down the cook time several hours. The following temperatures were used: first hour 375° F., second and third hours 500° F., fourth hour 425° F. Here the alkanol was added. The fifth hour was at 425° F., then increase to 450° F., hold there for ten minutes and then drop heating mantle. At the same time the nitrogen stream is increased. After 15 minutes or as soon as the temperature is below 375° F., the top water cooled condenser is removed to facilitate escape of mixed vapors. Heating of the flask is continued and the vapors produced in the flask are vented and pass out of the system. The heating is continued until the alcohol is substantially all removed by vaporization as indicated by the viscosity of the resin. (In some instances, the heating was continued under conditions whereby the condensed vapors were trapped out of the system and recovered as liquid in order to determine the amount of alcohol removed from the reaction zone.) At about 320° F., stirring is interrupted and a sample is taken for acid number determination. If the desired acid number, such as 30, has not been reached, cooking time is continued at 425° F. During the removal of the ethylhexanol of the example of the 13 ml. of alcohol added, 8 ml. were recovered in the distillate receiver; it is estimated that 2–3 ml. were lost during the cooling of the reaction vessel when it was vented to the atmosphere. Thus, about 80% of the 2-ethylhexanol was removed by vaporization of the completion of the polycondensation reaction.

Two typical unsaturated polyesters were prepared from the following reactants in the following molar proportions as set out in Table I.

*Table I*

| Reactant (Moles) | A | B |
|---|---|---|
| Trimellitic Anhydride | 1.0 | 1.0 |
| Isophthalic Acid | 4.5 | 1.0 |
| Maleic Anhydride | 6.0 | 2.0 |
| Propylene Glycol | 12.6 | 5.0 |
| Alkanol: | | |
| 2-Ethylhexanol | 0.6 | 0.5 |

The addition of the alkanol decreased the amount of observation needed toward the end of the run as determined by acid number over runs carried out without the addition of the alkanol. It was observed that the properties of the resins produced with the alkanol procedure of the invention were entirely comparable to those produced without utilizing the alkanol addition.

ILLUSTRATION

In an apparatus similar to that described in the above example, it is possible to carry out a reaction of the following type, wherein isophthalic acid, 1 mole; maleic anhydride, 1 mole; propylene glycol, 1.75 moles; and trimethylol propane, 0.25 mole are charged. This mixture of reactants provides a theoretical excess of hydroxyl groups over carboxyl groups. Carrying out this reaction under conditions such as given above in the example results in gelation at a resin acid number of 50–60. However, when the reaction is about 75 percent complete as determined by recovery of water of condensation reaction, 0.25 mole of propionic acid or isobutyric acid are added, the polycondensation reaction then continues smoothly to obtain a product having an acid number of about 20. The added propionic or isobutyric acid is then removed in this case essentially entirely by vaporization under conditions wherein the acid is condensed and removed from the reaction zone.

Thus, having described the invention, what is claimed is:

1. The method of condensing reactants which normally cross-link and form insoluble gels prior to completion of the desired condensation reaction to form a resinous polyester substantially free of cross-linking, which comprises conducting in a reaction zone the steps of (1) reacting a reactive mixture consisting essentially of reactants (A) a member of the group consisting of polycarboxylic acids having more than two active carboxyl groups and polyhydric alcohols having more than two active hydroxyl groups, and (B) a member of the group consisting of polycarboxylic acids having two active carboxyl groups and polyhydric alcohols having two active hydroxyl groups, in molar proportions that provide a slight excess of hydroxyl groups to carboxyl groups at condensation temperatures for a period of time sufficient to effect at least 50% reaction of said hydroxyl and carboxyl groups but insufficient to effect premature cross-linking of said reactants; (2) adding from about 0.1 to about 1 mole per mole of reactant A of a gelation inhibitor to said partially reacted mixture, said gelation inhibitor being a member of the group consisting of $C_{2-13}$ alkanol and $C_{2-8}$ alkanoic acid and having its functional group different from the functional group of said reactant A; (3) continuing the reaction of said partially reacted mixture at condensation temperature to complete the desired polycondensation reaction in the presence of said inhibitor whereby premature cross-linking of said reactants prior to completion of said reaction is inhibited; (4) removing substantially all of the unreacted gelation inhibitor from said reaction mixture under conditions whereby said unreacted inhibitor is vaporized and removed from said zone; and (5) thereafter removing said polyester from said reaction zone.

2. The method of esterifying reactants that normally cross-link and form insoluble gels prior to completion of the desired esterification reaction to form an unsaturated polyester resin substantially free of cross-linking, which comprises conducting in an esterification reaction zone the steps of (1) esterifying a reactive mixture consisting essentially of reactants (A) a member of the group consisting of trimellitic acid, trimellitic anhydride, trimesic acid, hemimellitic acid and hemimellitic anhydride; (B) a member of the group consisting of phthalic acid, phthalic anhydride, isophthalic acid and terephthalic acid; (C) a member of the group consisting of a maleic acid, fumaric acid, citraconic acid and their corresponding anhydrides; and (D) a $C_{2-8}$ alkylene glycol, which reactants normally cross-link and form insoluble gels prior to completion of the desired esterification reaction, in molar proportions that provide a slight excess of hydroxyl groups to carboxyl groups wherein the molar proportions of A to B is 1:9 to 9:1, A to C is 1:9 to 9:1, and the sum of A+B to C is 1:9 to 9:1, at esterification temperatures for a period of time sufficient to effect at least 50% reaction of said hydroxyl and carboxyl groups but insufficient to effect premature cross-linking of said reactants; (2) adding from about 0.1 to about 1 mole per mole of reactant A of a $C_{2-13}$ alkanol to said partially reacted mixture; (3) continuing the esterification of said partially reacted mixture at esterification temperatures in the presence of said alkanol until the desired esterification reaction is completed whereby premature cross-linking of said reactants is inhibited and said polyester resin is formed; (4) removing substantially all of the unreacted alkanol from said mixture under conditions whereby said alkanol is vaporized and removed from said zone; and (5) thereafter removing said polyester resin from said zone.

3. The method of claim 2 wherein reactant A is trimellitic anhydride.

4. The method of claim 2 wherein reactant B is isophthalic acid.

5. The method of claim 2 wherein reactant C is maleic anhydride.

6. The method of claim 2 wherein reactant D is propylene glycol.

7. The method of claim 2 wherein said alkanol is octyl alcohol.

8. The method of claim 2 wherein reactant A is trimellitic anhydride, reactant B is isophthalic acid, reactant C is maleic anhydride, D is propylene glycol, and said alkanol is 2-ethyl hexanol.

9. The method of preparing an unsaturated polyester resin substantially free of cross-linking and having an acid number of about 20, said resin consisting essentially of the esterification reaction product of isophthalic acid, maleic anhydride, propylene glycol and trimethylol propane, which reactants normally cross-link and form insoluble gels prior to completion of the esterification reaction and obtention of said acid number which comprises reacting in a reaction zone a reactive mixture consisting essentially of 1 mole of isophthalic acid, 1 mole of maleic anhydride, 1.75 moles propylene glycol and 0.25 mole of trimethylol propane, wherein said reaction mixture contains a slight excess of hydroxyl to carboxyl groups, at esterification temperatures for a period of time sufficient to effect about 75% reaction of said hydroxyl and carboxyl groups; adding 0.25 mole of propionic acid to said partially reacted mixture in said zone and continuing heating said reaction mixture at esterification temperatures in the presence of said propionic acid until said polyester resin having said acid number is obtained whereby premature cross-linking of said reactants is inhibited; and removing substantially all of the unreacted propionic acid from said reaction mixture comprising said polyester resin in said zone under conditions whereby said propionic acid is vaporized and removed from said zone; and thereafter removing said resin from said zone.

References Cited by the Examiner

UNITED STATES PATENTS

| | | | |
|---|---|---|---|
| 1,932,688 | 10/33 | Brubaker | 260—77 |
| 2,035,528 | 3/36 | Brubaker | 260—77 |
| 2,562,878 | 8/51 | Blair | 260—75 |
| 2,936,297 | 5/60 | Bavley et al. | 260—77 |
| 3,040,000 | 6/62 | Stephens | 260—77 |
| 3,070,256 | 12/62 | Bremmer et al. | 220—64 |

OTHER REFERENCES

Trimellitic Anhydride, Amoco Chemicals Bulletin, 1958.

WILLIAM H. SHORT, *Primary Examiner.*

PHILIP E. MANGAN, LOUISE P. QUAST, *Examiners.*